US012686345B2

(12) United States Patent
  Kwon et al.

(10) Patent No.: US 12,686,345 B2
(45) Date of Patent: Jul. 21, 2026

(54) A-PILLAR BRACKET FOR VEHICLES WITH IMPROVED WIRING ASSEMBLY

(71) Applicant: DAEHAN SOLUTION CO., LTD, Incheon (KR)

(72) Inventors: Choong Ho Kwon, Seoul (KR); Park Su Gyun, Incheon (KR)

(73) Assignee: DAEHAN SOLUTION CO., LTD., Incheon (KR)

( * ) Notice: Subject to any disclaimer, the term of this patent is extended or adjusted under 35 U.S.C. 154(b) by 216 days.

(21) Appl. No.: 18/782,607

(22) Filed: Jul. 24, 2024

(65) Prior Publication Data

US 2025/0033579 A1     Jan. 30, 2025

(30) Foreign Application Priority Data

Jul. 27, 2023    (KR) ........................ 10-2023-0097886

(51) Int. Cl.
  *B60R 16/00*       (2006.01)
  *B60R 13/02*       (2006.01)
  *B60R 16/02*       (2006.01)
(52) U.S. Cl.
  CPC ...... *B60R 16/0207* (2013.01); *B60R 13/0212* (2013.01); *B60R 2013/0287* (2013.01)

(58) Field of Classification Search
  CPC ............ B60R 16/0207; B60R 13/0212; B60R 2013/0287
  USPC ......................................................... 296/214
  See application file for complete search history.

(56) References Cited

FOREIGN PATENT DOCUMENTS

| | | |
|---|---|---|
| KR | 10-2016-0092544 A | 8/2016 |
| KR | 10-2193300 B1 | 12/2020 |
| KR | 10-2022-0055691 A | 5/2022 |

*Primary Examiner* — Steven O Douglas
(74) *Attorney, Agent, or Firm* — Dickinson Wright PLLC

(57) ABSTRACT

The present invention provides an A-pillar bracket for vehicles with improved wiring assembly capable of being used for general purposes, by installing a pair of rotating pieces formed to rotate facing each other on two supports formed to face each other so that each rotating piece is rotatable in place, where each of the rotating pieces is configured to adjust a rotation angle twice by forcibly rotating with respect to the support, thereby stably supporting and fixing wiring even when the thickness of the wiring fixed and supported by the A-pillar bracket becomes thicker. In particular, the present invention provides an A-pillar bracket for vehicles with improved wiring assembly capable of more stably supporting and fixing wiring even when the thickness of the wiring changes by forming a pressing protrusion on at least one of two rotating pieces and configuring a portion wrapping the wiring in an arc shape.

6 Claims, 13 Drawing Sheets

A-PILLAR BRACKET FOR VEHICLES WITH IMPROVED WIRING ASSEMBLY

CROSS-REFERENCE TO RELATED APPLICATION

This application claims priority to and the benefit of Korean Patent Application No. KR 10-2023-0097886, filed on Jul. 27, 2023, the disclosure of which is incorporated herein by reference in its entirety.

BACKGROUND

1. Field of the Invention

The present invention relates to an A-pillar bracket for vehicles with improved wiring assembly, and more particularly, to an A-pillar bracket for vehicles configured so that a pair of rotating pieces are installed to rotate in place between two supports facing each other and rotation angles of the two rotating pieces are adjusted based on respective supports, thereby making it possible to, even when the thickness of wiring fixed between the two rotating pieces changes, immediately adjust and fix the rotation angles accordingly. In this case, each of the rotating pieces is configured so that the rotation angle is primarily adjusted by forcing an interference protrusion formed radially at the center of rotation to go over another interference protrusion formed radially on the support, and at the same time, the rotation angle is secondarily adjusted by allowing a stopper formed on the support to be inserted into a neighboring adjustment groove among a plurality of adjustment grooves formed on the rotating piece, thereby making it possible to firmly support and fix the wiring of different thicknesses with a simple structure and double.

2. Discussion of Related Art

In general, a headliner is installed inside a vehicle to face a roof panel. An A-pillar bracket (or plate) is mounted on a front edge of the headliner to support an A-pillar, and the A-pillar bracket is equipped with wiring for supplying electric power to electronic devices, lights, speakers, and the like, mounted on the headliner through a battery installed in an engine compartment of the vehicle.

Accordingly, regarding the A-pillar bracket, Korean Patent Publication No. 10-2022-0055691 (published on May 4, 2022), Korean Patent Publication No. 10-2016-0092544 (published on Aug. 5, 2016), and Korean Patent Registration No. 10-2193300 (registered on Dec. 15, 2020) disclose technology for firmly supporting wiring so that the wiring may be stably supported and fixed without loosening due to vibration or the like when a vehicle is traveling.

In Korean Patent Publication No. 10-2022-0055691, an assembled configuration may be provided by putting a mounting ring on wiring fixed to the pillar bracket and inserting the mounting ring into a guide groove formed on the pillar bracket so that anyone easily and accurately mounts the wiring at a designated position, thereby improving work efficiency, and, in addition, preventing assembly defects. In particular, by forming a hole through the pillar bracket facing the guide groove, the mounting ring portion may be inserted into the hole so that the wiring is assembled in a designated position without being easily separated from the guide groove. In addition, a support may be formed on the pillar bracket to support the wiring inserted into the guide groove, and the support may be configured to be supported by at least one reinforcing rib so that the wiring is stably supported and fixed without sagging.

In Korean Patent Publication No. 10-2016-0092544, a pillar plate for vehicles equipped with fixture for fixing a wire capable of solving problems such as noise, electrical disconnection and short circuit, and the like, is provided by configuring a cover that is integrated with a body plate to be fixed by hanging on a locking hump formed on the body plate while wrapping wiring, thereby fixing the wire in a state of being fully wrapped by the cover and the body plate to prevent the wire from being separated or falling from the body plate. In particular, the pillar plate for vehicles equipped with fixture for fixing a wire is provided by further configuring a pair of elastic pieces to wrap the wiring on a surface facing the body plate, thereby making it possible to elastically support the wiring to prevent the wire from being separated and fix the wire with stronger force, and also to allow wires of different diameters to be accommodated. In addition, the pillar plate for vehicles equipped with fixtures for fixing a wire is provided by integrally forming the cover when manufacturing the body plate, thereby not only making a manufacturing process easier, but also eliminating a preliminary process of separately mounting the cover to the body plate, so that assembly efficiency is increased.

In Korean Patent Registration No. 10-2193300, a pillar plate for vehicles capable of improving aesthetics is provided by integrally forming a support portion to protrude on a lower edge of the pillar plate to be pressed against a cable as the cable is installed between pads installed on the lower edge and middle portion of the pillar plate, respectively, thereby causing the cable mounted between the two pads to push the pillar plate and a headliner toward the interior of a vehicle so that gaps or humps that may occur between a pillar trim and a headliner are eliminated. In particular, a pillar plate for vehicles capable of further enhancing the aesthetic improvement effect is provided by configuring the support portion to be supported in a state of being overlapped with the cable mounted between the two pads so that the pillar plate has the effect of always stably pushing a headliner toward the interior of a vehicle.

SUMMARY OF THE INVENTION

However, the existing A-pillar brackets have the following problems.

(1) Since the thickness of wiring installed to pass through an A-pillar bracket and a headliner through an A-pillar may change, as the existing A-pillar bracket is manufactured to fix wiring of a predetermined thickness, when the thickness of the wiring changes as described above, there is a problem that the wiring cannot be firmly fixed according to the change.

(2) That is, as new electronic devices are installed for the convenience of drivers and passengers separately from the lighting and electronic devices previously installed in a headliner, the thickness of the wiring is required to become thicker in order to supply electric power to the newly installed electronic devices, and thus it is difficult to mount the wiring on the existing A-pillar bracket.

(3) This means that the A-pillar bracket has to be remanufactured whenever the thickness of the wiring changes. This not only requires more manufacturing costs, but also becomes a factor in reducing manufacturing efficiency, because a mold used to manufacture the A-pillar bracket has to be remanufactured.

(4) In addition, since the existing A-pillar bracket has to be remanufactured according to the wiring that supports and fixes the A-pillar bracket, it is not possible to use the A-pillar bracket for general purposes.

The present invention has been conceived in consideration of the aforementioned problems, and is directed to providing an A-pillar bracket for vehicles with improved wiring assembly capable of being used for general purposes without manufacturing a separate A-pillar bracket, by installing a pair of rotating pieces formed to rotate facing each other on two supports formed to face each other so that each rotating piece is rotatable in place, where each of the rotating pieces is configured to adjust a rotation angle twice by forcibly rotating with respect to the support, thereby stably supporting and fixing wiring even when the thickness of the wiring fixed and supported by the A-pillar bracket becomes thicker.

In particular, the present invention is directed to providing an A-pillar bracket for vehicles with improved wiring assembly capable of more stably supporting and fixing wiring even when the thickness of the wiring changes by forming a pressing protrusion on at least one of two rotating pieces and configuring a fixing portion wrapping the wiring in an arc shape.

In addition, the present invention is directed to providing an A-pillar bracket for vehicles with improved wiring assembly capable of allowing anyone to quickly assemble in a designated position by configuring each rotating piece so that a guide is formed on a surface thereof facing the other support, up to a portion that is the center of rotation, so that a rotating protrusion that is formed on the support and is the center of rotation is easily, conveniently, and accurately guided through the guide.

According to an aspect of the present invention, there is provided an A-pillar bracket for vehicles with improved assembly including a bracket body (100) mounted on an edge of a headliner (H) installed to face a roof panel inside a vehicle, the bracket body (100) includes two supports (110) installed to face each other; and a pair of rotating pieces (120' and 120") that are installed to individually rotate in place and outer sides of which are installed to rotate in place on the supports (110), respectively, to rotate to face each other, the support (110) includes a rotating protrusion (111) formed to protrude from a surface facing each other and having interference protrusions (111a) radially protruding based on a center at a protruding end thereof and a stopper (112) formed to be spaced apart from the rotating protrusion (111) by a predetermined distance, and on each of the rotating pieces (120' and 120"), a rotation groove (121) formed to primarily adjust a rotation angle by radially forming other interference protrusions (121a) corresponding to the interference protrusions (111a) on a surface facing the support (110) to allow the rotating protrusion (111) to be inserted, a plurality of adjustment grooves (122) formed on an imaginary circle whose radius is a distance to the stopper (112) based on the rotation groove (121) to secondarily adjust the rotation angle while going over the stopper (112), and a fixing portion (123) formed to protrude outward from each rotating piece (120' or 120") and disposed to face the other are formed.

In particular, a guide (124) extending from the interference protrusion (121a) to an edge of each of the rotating pieces (120' and 120") may be formed by being cut in the rotating pieces (120' and 120").

4

In addition, a plurality of pressing protrusions (123a) may be formed to protrude from at least one of surfaces facing each other in the fixing portions (123) formed on the rotating pieces (120' and 120").

Further, the rotating pieces (120' and 120") on which the pressing protrusions (123a) are formed may be formed in an arc shape.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

A set of FIGS. 2A and 2B are enlarged views showing the A-pillar bracket for vehicles with improved wiring assembly according to the present invention, where.

A set of FIGS. 4A and 4B are views showing a support formed on a bracket body according to the present invention, where.

A set of FIG. 5A to 5C are views showing one rotating piece according to the present invention, where.

A set of FIGS. 6A and 6B are views showing another rotating piece according to the present invention, where.

DETAILED DESCRIPTION OF EXEMPLARY EMBODIMENTS

Figure 1:
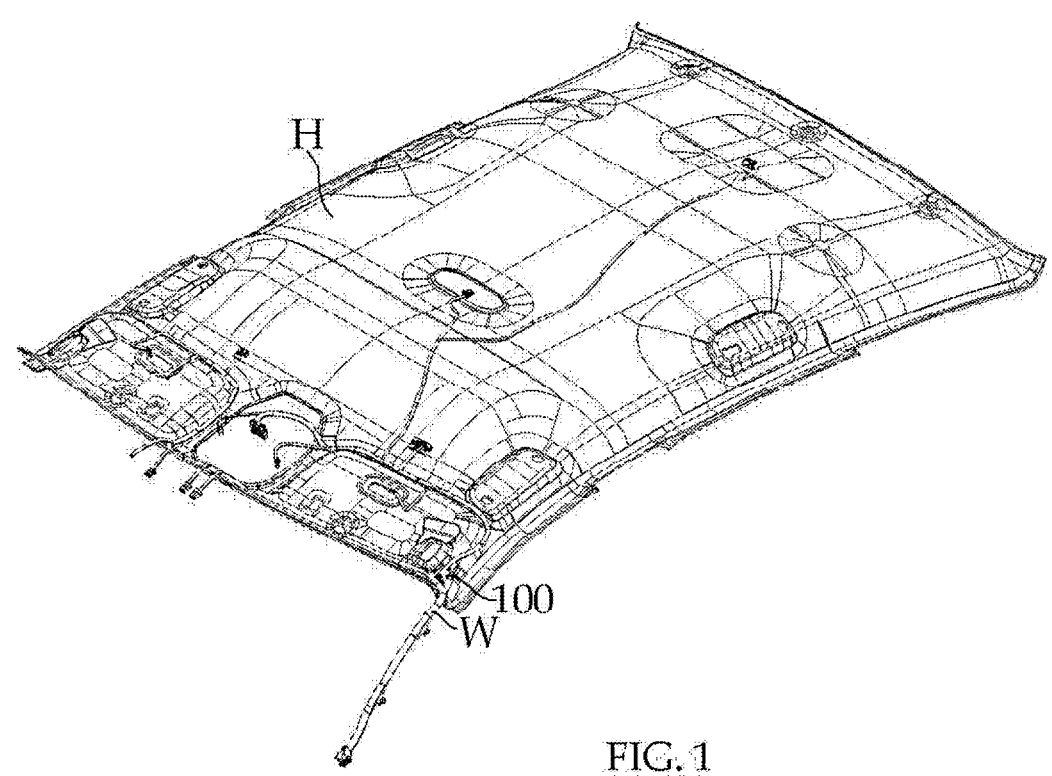
FIG. 1 is a perspective view showing a headliner to which an A-pillar bracket for vehicles with improved wiring assembly according to the present invention is applied.
Figure 2A:
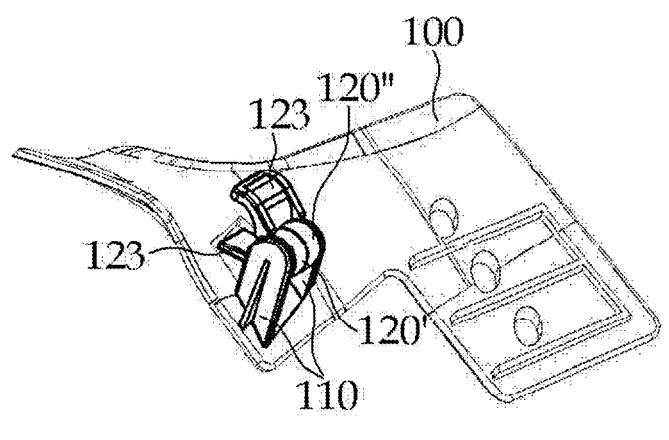
FIG. 2A is a perspective view and FIG. 2B is a side view.
Figure 2B:
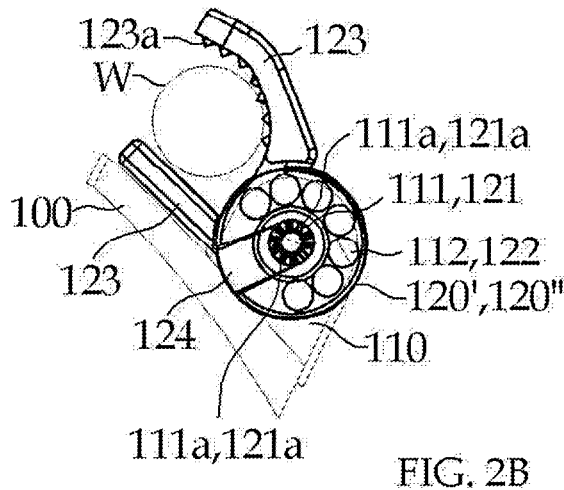
Figure 3:
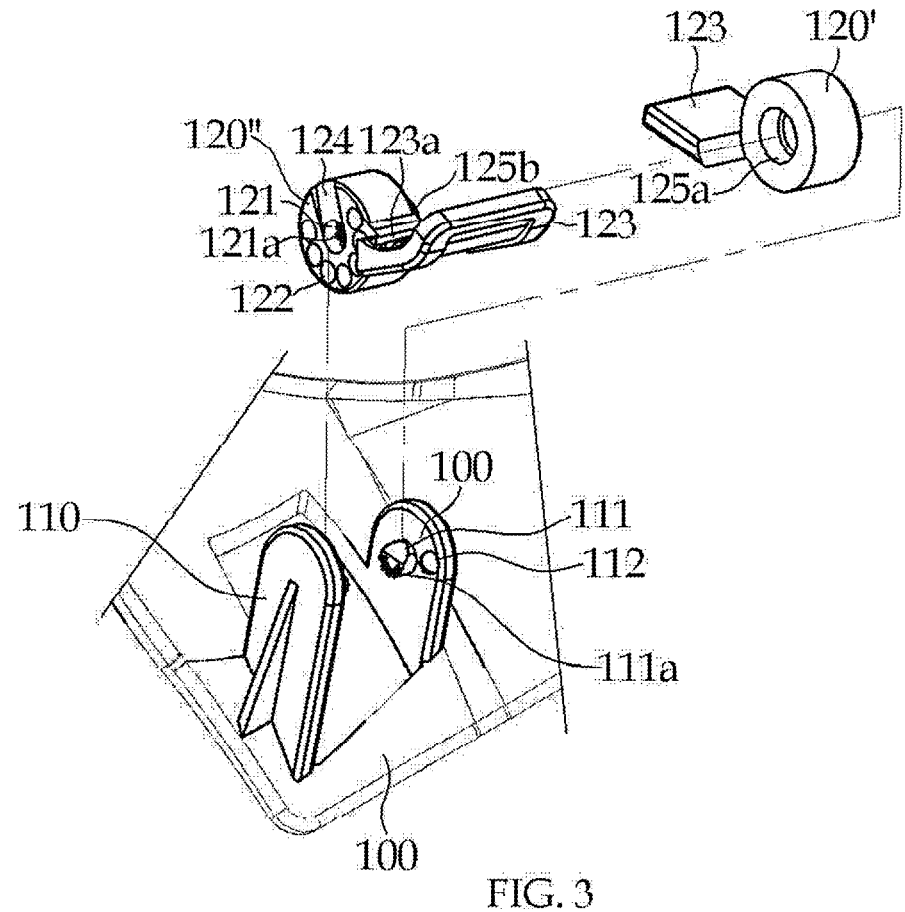
FIG. 3 is a partially enlarged and disassembled perspective view for showing a configuration of the A-pillar bracket for vehicles with improved wiring assembly according to the present invention.
Figure 4A:
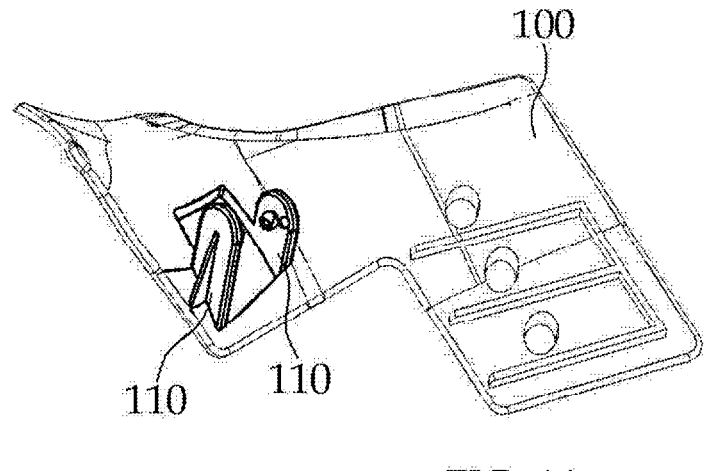
FIG. 4A is a perspective view of the bracket body and FIG. 4B is a perspective view showing one support.
Figure 4B:
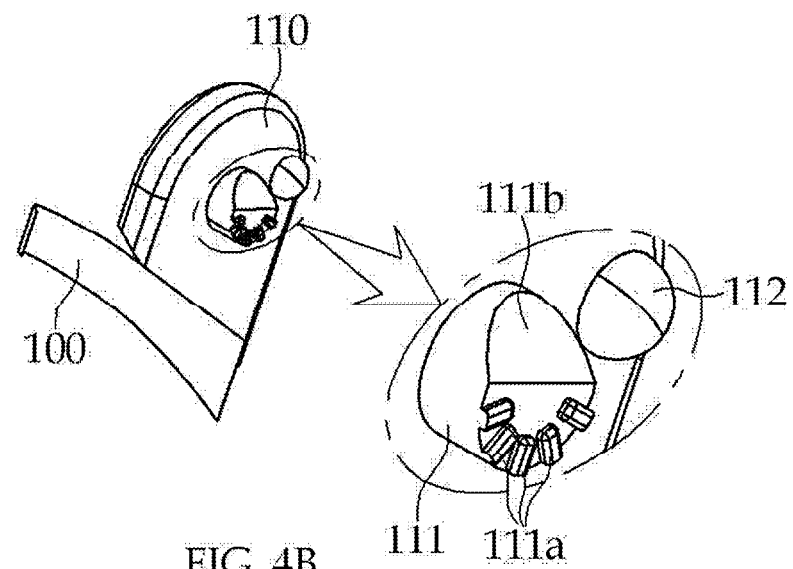
Figure 5A:
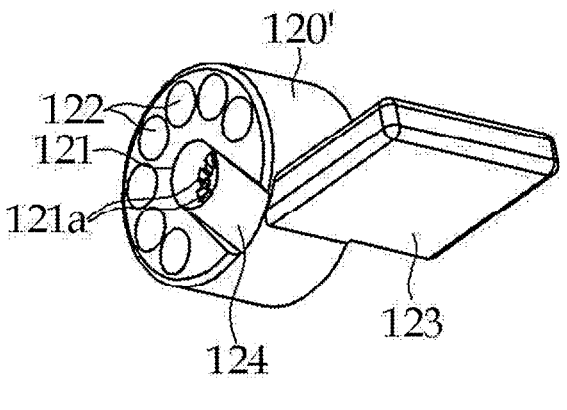
FIG. 5A is a perspective view.
Figure 5B:
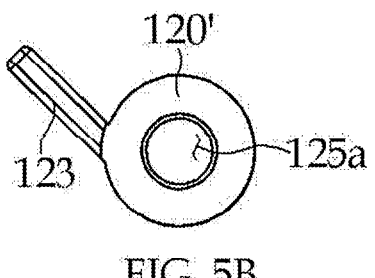
FIG. 5B is a front view.
Figure 5C:
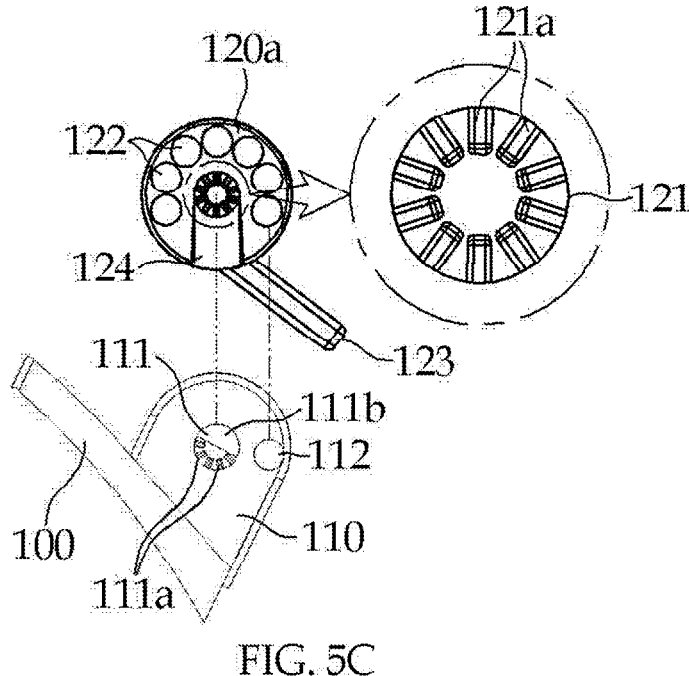
FIG. 5C is a side view showing a state where the rotating piece is fixed to a support.
Figure 6A:
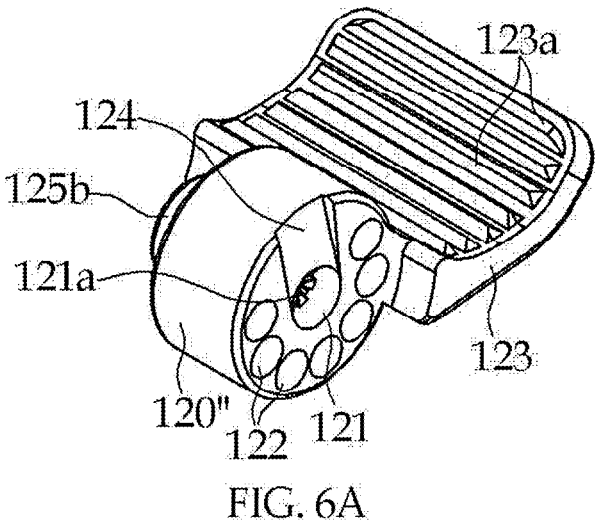
FIG. 6A is a perspective view and FIG. 6B is a front view; and A set of FIGS. 7A and 7B are front views showing states before (FIG. 7A) and after (FIG. 7B) wiring is fixed to the A-pillar bracket for vehicles with improved wiring assembly according to the present invention.
Figure 6B:
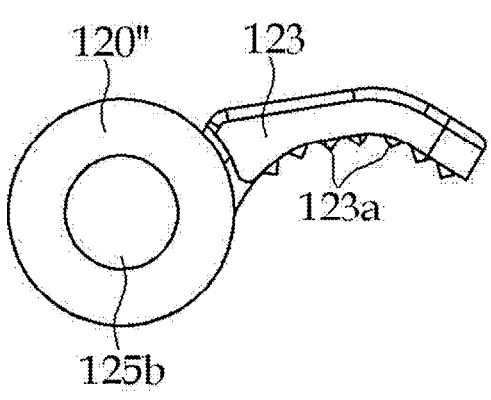
Figure 7A:
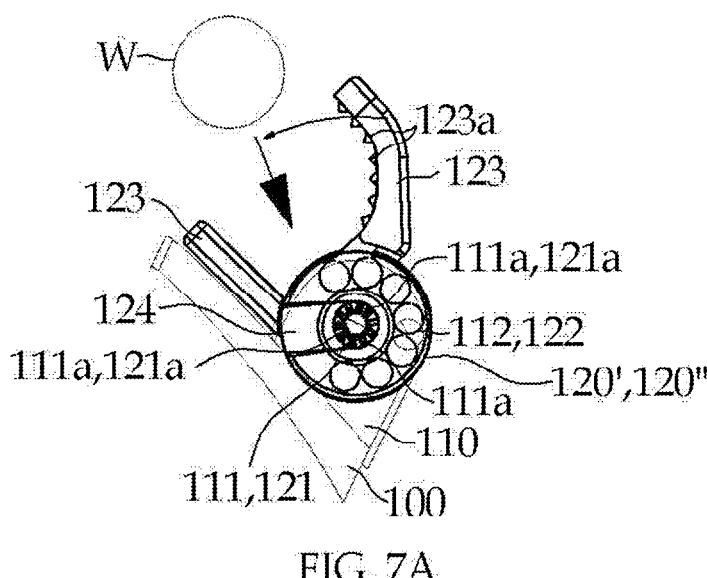
Figure 7B:
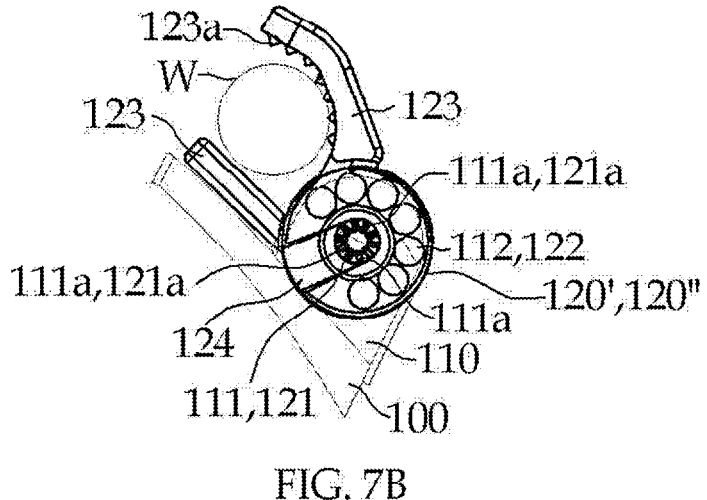

Hereinafter, preferred embodiments of the present invention will be described in more detail with reference to the accompanying drawings. Prior to the description, terms or words used in this specification and claims should not be restrictively interpreted as ordinary meanings or dictionary-based meanings, but should be interpreted as meanings and concepts conforming to the technical aspects of the present invention according to the principle that an inventor is allowed to properly define concepts of terms to describe his or her invention in the best ways.

Therefore, embodiments described in the specification and configurations shown in the drawings are merely the most preferred embodiment of the present invention, but are not intended to fully describe the technical aspects of the present invention, so it should be understood that a variety of other equivalents and modifications could be made thereto at the time of filing the application.

[Configuration of A-Pillar Bracket for Vehicles]

As shown in FIG. 1 to FIG. 7B, an A-pillar bracket for vehicles with improved wiring assembly according to the present invention includes a bracket body 100 mounted on a front edge of a headliner H, and the bracket body 100 includes two supports 110, and a pair of rotating pieces 120' and 120" installed to individually rotate in place, where but both sides thereof are rotatably mounted on the supports 110.

In particular, on the support 110, a plurality of interference protrusions 111a may be radially formed based on the center of a rotating protrusion 111 that supports the rotation of each of the rotating pieces 120' and 120" on surfaces thereof facing each other, a stopper 112 may be formed at a certain distance away from the rotating protrusion 111, a rotation groove 121 may be formed on the rotating pieces 120" and 120' to face the rotating protrusion 111, and another interference protrusion 121a may be formed to protrude facing the interference protrusion 111a in the rotation groove 121 so that as the rotating pieces 120' and 120" are rotated in a state where the rotation groove 121 is coupled to the rotating protrusion 111, a rotation angle is primarily adjusted and at the same time, separation is prevented, and the rotating pieces 120' and 120" may be configured to form a plurality of adjustment grooves 122 facing the stopper 112 so that as the rotating pieces 120' and 120" are rotated, the adjustment grooves 122 go over the stopper 112 to prevent the separation in addition to secondarily adjusting the angle.

In particular, as a guide 124 extending from the interference protrusion 121a to an edge of each of the rotating pieces 120' and 120" is cut in each of the rotating pieces 120' and 120", the adjustment grooves 122 may be easily guided to the rotating protrusion 111 so that assembly at a designated position is made.

In addition, on each of the rotating pieces 120' and 120", as a pressing protrusion 123a is molded to protrude on one of the fixing portions 123 for fixing wiring W by pressing both sides of the wiring W, the pressing protrusion 123a may be firmly engaged with the surface of the wiring W so that the wiring W is firmly supported and fixed without being separated or coming out from the fixing portions 123. In this case, the fixing portion 123 may be formed to be curved in an arc shape, thereby increasing the adhesion of the fixing portions 123 to the surface of the wiring W so that the wiring is more firmly supported and fixed.

Hereinafter, such a configuration will be described in more detail with reference to the accompanying drawings. Here, a reference sign "H" represents a headliner installed facing a roof panel in the interior of a vehicle, and a reference sign "W" represents wiring installed above the headliner and supported by the A-pillar bracket.

Bracket Body

The bracket body 100 is mounted on a front edge of the headliner H, as shown in FIG. 1. Accordingly, the bracket body 100 is manufactured to increase adhesion by being formed in a shape that is the same or similar to the shape of the portion of the headliner H to which the bracket body is mounted.

The bracket body 100 includes the two supports 110 and a pair of rotating pieces 120' and 120", as shown in FIG. 2A to FIG. 7B.

A. Supports

As shown in FIG. 2A to FIG. 5B, a pair of supports 110 may be formed to protrude facing each other so that a pair of rotating pieces 120' and 120", which will be described below, receive rotation support in place.

In this case, as shown in FIG. 2A to FIG. 5B, the plurality of supports 110 are formed to face each other in parallel along a direction in which the wiring W passes in consideration of a mounting direction of the wiring W passing over the bracket body 100.

In addition, on the support 110, the rotating protrusion 111 and the stopper 112 are formed, as shown in FIG. 2A to FIG. 5B.

1. Rotating Protrusion

The rotating protrusions 111 are protrusions formed to face each other and protrude from the surfaces of the supports 110 facing each other, as shown in FIG. 2A to FIG. 5B. In this case, the rotating protrusion 111 is formed to protrude integrally with the support 110 to be in a position where the rotating protrusion 111 may support each of the rotating pieces 120' and 120", which will be described below, to rotate in place.

In particular, interference protrusions 111a are formed on the rotating protrusions 111 formed to face each other in this way, as shown in FIG. 4A to FIG. 5C. In addition, a slope 111b may be formed on the rotating protrusion 111 so that the rotating pieces 120' and 120" may be easily assembled.

(1) Interference Protrusions

As shown in FIG. 4A to FIG. 5C, a plurality of interference protrusions 111a are formed to protrude from facing surfaces of the rotating protrusions 111 formed to face each other on a pair of supports 110. In this case, the interference protrusions 111a are formed to protrude radially based on the center of rotation of the rotating protrusion 111, so that, as the rotating pieces 120' and 120" assembled on the rotating protrusion 111, which will be described below, are forcibly rotated, the rotation angles of the rotating pieces 120' and 120" are primarily adjusted and fixed while other interference protrusions 121a formed on the rotating pieces 120' and 120" forcibly go over the interference protrusions 111a.

(2) Slope

The slope 111b is formed by cutting a portion of an end portion protruding outward from the rotating protrusion 111 described above, as shown in FIGS. 4A and 4B and FIGS. 5A to 5C. In this case, the slope 111b is formed on each of the rotating pieces 120' and 120", which will be described below, so that when the rotating protrusion 111 is forcibly inserted into the rotation groove 121, which is the central portion when rotating in place, the rotating protrusion 111 is guided to be easily inserted into the rotation groove 121 along the slope 111b.

2. Stopper

As shown in FIGS. 4A and 4B, FIGS. 5A, 5B, and 5C, and FIGS. 7A and 7B, the stopper 112 is formed to protrude from the support 110 described above on an imaginary circle with a predetermined diameter centered on the rotating protrusion 111. In this case, as the rotating pieces 120' and 120", which will be described below, are rotated in place, the stopper 112 secondarily fixes the rotation angles so that the rotating pieces 120' and 120" are not rotated any further by being forcibly inserted into a plurality of adjustment grooves 122 formed on the rotating pieces 120' and 120" and then being forcibly inserted into any one adjustment groove 122 while being separated therefrom.

B. Rotating Pieces

As shown in FIG. 3 and FIG. 5A to FIG. 7B, the rotating pieces 120' and 120" may be configured to be assembled so that the rotating pieces individually rotate in place, may be assembled on the supports 110 described above in the assembled state, and may be mounted so that respective rotation angles are adjusted. Accordingly, among the surfaces facing each other, a rotating protrusion 125b is formed to protrude on one rotating piece 120", and a support hole 125a into which the rotating protrusion 125b is inserted is formed on the other rotating piece 120'.

Meanwhile, as shown in FIG. 3 and FIG. 5A to FIG. 7B, each of the rotating pieces 120' and 120" includes the rotation groove 121 that primarily adjusts the in-place rotation of a corresponding one of the rotating pieces 120' and 120", the adjustment groove 122 that secondarily adjusts the in-place rotation of the corresponding one of the rotating pieces 120' and 120", and a fixing portion 123 that fixes the wiring W. In addition, the guide 124 may be further included to guide each of the rotating pieces 120' and 120" so that the rotating piece is easily assembled on the support 110.

1. Rotation Groove

As shown in FIG. 3, FIGS. 5A to 5C, and FIGS. 7A and 7B, the rotation groove 121 is a groove that allows the rotating pieces 120' and 120" to rotate in place by inserting the rotating protrusion 111 into the rotation groove 121 while the supports 110 spread outward as the rotating pieces 120' and 120" in a state where the rotating protrusions 125b and the support holes 125a are aligned to rotate in place are forcibly inserted between the supports 110.

In particular, as shown in FIG. 3, FIGS. 5A to 5C, and FIGS. 7A and 7B, in the rotation groove 121, a plurality of interference protrusions 121a may be formed to protrude radially based on the center of the rotation groove 121 so that as the rotating pieces 120' and 120" are forcibly rotated in place in the state where the rotation groove 121 is assembled on the rotating protrusion 111 in this way, the rotation angles of the rotating pieces 120' and 120" are primarily adjusted while the interference protrusions 121a go over the other interference protrusions 111a described above.

2. Adjustment Grooves

As shown in FIG. 3, FIGS. 5A to 5C, and FIGS. 7A and 7B, a plurality of adjustment grooves 122 are formed on an imaginary circle centered on the rotation groove 121 described above, and in particular, when one of the adjustment grooves is inserted into the stopper 112 described above and the rotating pieces 120' and 120" are forcibly rotated as described above to primarily adjust the rotation angle, adjacent adjustment grooves 122 sequentially go over the stopper 112 to secondarily adjust the rotation angle.

3. Fixing Portion

As shown in FIG. 3, FIGS. 5A to 5C, and FIGS. 7A and 7B, the fixing portion 123 is formed to protrude outward from each of the rotating pieces 120' and 120". In this case, the wiring W is placed between two fixing portions 123 formed on each of the rotating pieces 120' and 120", and according to the thickness of the wiring W, the rotation angles of the rotating pieces 120' and 120" are primarily and secondarily adjusted as described above to firmly fix the wiring W.

In this case, the fixing portion 123 may be manufactured in any shape as long as the fixing portion is in a form that protrudes outward from each of the rotating pieces 120' and 120" and support the wiring W on both sides of the wiring W so that the wiring W may be firmly fixed without being separated or coming out. Accordingly, in a preferred embodiment of the present invention, as shown in FIGS. 6A and 6B and FIGS. 7A and 7B, at least one of these fixing portions 123 may be formed in an arc shape to wrap the wiring W so that the wiring W is firmly supported and fixed without being easily separated or coming out.

In addition, as shown in FIGS. 6A and 6B and FIGS. 7A and 7B, when formed in an arc shape, it is preferable that the fixing portion 123 may be configured such that a plurality of pressing protrusions 123a are formed to protrude on surfaces facing each other so that the pressing protrusions 123a press the wiring W when the fixing portion 123 fixes the wiring W while wrapping the wiring W to more stably support and fix the wiring W.

4. Guide

The guide 124 are formed by being cut from each interference protrusion 121a toward the edge of each of the rotating pieces 120' and 120", as shown in FIG. 3, FIGS. 5A and 5B, and FIGS. 6A and 6B. This may allow the rotating protrusion 111 to be guided by the guide 124 when the rotation groove 121 is assembled to the rotating protrusion 111, so that assembly may be carried out by quickly and accurately guiding the rotating protrusion 111 to the designated rotation groove 121.

As described above, the present invention may be configured to maintain the assembled state twice by assembling a pair of rotating pieces assembled to individually rotate in place between the two supports so that not only the wiring is firmly fixed and supported, but also the wiring is used for general purposes even when the thickness of the wiring changes.

An A-pillar bracket for vehicles with improved wiring assembly according to the present invention has the following effects.

(1) A pair of rotating pieces installed to rotate in place between two facing supports can be configured to be forced to rotate in the form of scissors so that rotation angles of the rotating pieces can be adjusted and used according to the thickness of wiring.

(2) This allows one A-pillar bracket to be used for general purposes even when the thickness of the wiring is different, which not only reduces manufacturing costs, but also allows the wiring to be easily fixed and assembled.

(3) Meanwhile, as each of a pair of rotating pieces is configured to adjust the rotation angle on the support, a mounting position of the wiring can also be adjusted to some extent, and thus even when the thickness and mounting position of the wiring are different depending on a vehicle type, an A-pillar bracket can be used for general purposes.

(4) In addition, the rotating piece is configured to primarily adjust the rotation angle according to the thickness of the wiring while forcibly going over an interference protrusion as the rotating piece is rotated and, at the same time, secondarily adjust the rotation angle while an adjustment groove forcibly goes over on a stopper so that the wiring can be firmly fixed, and furthermore, the wiring also does not easily come out or separate in the fixed state, making the A-pillar bracket safe to use.

(5) At least one of the rotating pieces is configured to wrap the wiring by being formed into an arc shape, and a pressing protrusion may be formed to protrude on a surface facing the wiring in this way, thereby more firmly fixing the wiring so that the A-pillar bracket firmly supports and fixes the wiring even against vibrations that occur when a vehicle is traveling.

(6) Finally, as a guide is formed by being cut from the interference protrusion, which is the rotation center of the rotating piece, toward an edge of each rotating piece, when the rotating piece is assembled, the rotating piece can be quickly and accurately fixed in a designated position through the guidance of the guide to be conveniently used.

What is claimed is:

1. An A-pillar bracket for vehicles with improved wiring assembly comprising a bracket body (100) mounted on an edge of a headliner (H) installed to face a roof panel inside a vehicle, wherein the bracket body (100) includes two supports (110) installed to face each other and a pair of rotating pieces (120' and 120") that are installed to individually rotate in place and outer sides of which are installed to rotate in place on the supports (110), respectively, to rotate to face each other, the support (110) includes a rotating protrusion (111) formed to protrude from a surface facing each other and having interference protrusions (111a) radially protruding based on a center at a protruding end thereof and a stopper (112) formed to be spaced apart from the rotating protrusion (111) by a predetermined distance, and on each of the rotating pieces (120' and 120"), a rotation groove (121) formed to primarily adjust a rotation angle by radially forming other interference protrusions (121a) corresponding to the interference protrusions (111a) on a surface facing the support (110) to allow the rotating protrusion (111) to be inserted, a plurality of adjustment grooves (122) formed on an imaginary circle whose radius is a distance to the stopper (112) based on the rotation groove (121) to secondarily adjust the rotation angle while going over the stopper (112), and a fixing portion (123) formed to protrude outward from each rotating piece (120' or 120") and disposed to face each other are formed.

2. The A-pillar bracket of claim 1, wherein a guide (124) extending from the interference protrusion (121a) to an edge of each of the rotating pieces (120' and 120") is formed by being cut in the rotating pieces (120' and 120").

3. The A-pillar bracket of claim 2, wherein a plurality of pressing protrusions (123a) are formed to protrude from at least one of surfaces facing each other in the fixing portions (123) formed on the rotating pieces (120' and 120").

4. The A-pillar bracket of claim 3, wherein the fixing portion (123) on which the pressing protrusions (123a) are formed is molded in an arc shape.

5. The A-pillar bracket of claim 1, wherein a plurality of pressing protrusions (123a) are formed to protrude from at least one of surfaces facing each other in the fixing portions (123) formed on the rotating pieces (120' and 120").

6. The A-pillar bracket of claim 5, wherein the fixing portion (123) on which the pressing protrusions (123a) are formed is molded in an arc shape.

* * * * *